(12) United States Patent
Lindblom (10) Patent No.: US 9,776,793 B2
(45) Date of Patent: Oct. 3, 2017

(54) METHOD AND A DEVICE FOR MOVING OBJECTS ON SHELVES

(71) Applicant: KNAPP AG, Hart bei Graz (AT)

(72) Inventor: Bo Lindblom, Osby (SE)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 15/124,172

(22) PCT Filed: Mar. 6, 2015

(86) PCT No.: PCT/SE2015/050253
§ 371 (c)(1),
(2) Date: Sep. 7, 2016

(87) PCT Pub. No.: WO2015/137865
PCT Pub. Date: Sep. 17, 2015

(65) Prior Publication Data
US 2017/0022009 A1    Jan. 26, 2017

(30) Foreign Application Priority Data
Mar. 11, 2014   (SE) .................... 1450272

(51) Int. Cl.
*B65G 1/04* (2006.01)
*B60P 3/00* (2006.01)

(52) U.S. Cl.
CPC ......... *B65G 1/0492* (2013.01); *B65G 1/0414* (2013.01); *B60P 3/00* (2013.01)

(58) Field of Classification Search
CPC ............................ B65G 1/0414; B65G 1/0492
See application file for complete search history.

(56) References Cited

U.S. PATENT DOCUMENTS

| | | | |
|---|---|---|---|
| 3,800,963 A | 4/1974 | Holland | |
| 4,972,778 A * | 11/1990 | Suominen | B66D 1/39 104/183 |
| 5,350,270 A * | 9/1994 | Stallard | B65G 1/06 211/151 |
| 5,370,492 A * | 12/1994 | Gleyze | B65G 1/0492 414/279 |
| 6,042,321 A | 3/2000 | Labell | |

(Continued)

FOREIGN PATENT DOCUMENTS

| | | |
|---|---|---|
| JP | 2001-206507 A | 7/2001 |
| WO | 2013-013252 A1 | 1/2013 |

OTHER PUBLICATIONS

Int'l Search Report and Written Opinion issued in connection with Int'l Appl'n No. PCT/SE2015/050253 on Nov. 6, 2015.

*Primary Examiner* — Kaitlin Joerger
(74) *Attorney, Agent, or Firm* — Merchant & Gould P.C.

(57) ABSTRACT

A method and a device for moving objects (44) on shelves (14;16) of a storing systems by operating a shuttle (42) between a plurality of ends of said shelves comprising the steps of engaging a first strip (30) at a first side of a support head (46) of said shuttle, engaging a second strip (30') at a second side of said support head of said shuttle (42) opposing said first side, and displacing said shuttle (42) along said shelves (14; 16) by pushing and retracting said strips (30, 30'). Propelling means (38) are arranged to displace said shuttle (42) along said shelves (14; 16) by pushing and retracting said strips (30; 30').

11 Claims, 6 Drawing Sheets

(56) References Cited

U.S. PATENT DOCUMENTS

| | | | | |
|---|---|---|---|---|
| 6,234,303 B1* | 5/2001 | Gales | ............... | B65G 1/0492 |
| | | | | 198/817 |
| 9,181,031 B2* | 11/2015 | Beewen | ............ | B65G 1/0492 |
| 2007/0144991 A1 | 6/2007 | Hansl et al. | | |
| 2010/0320010 A1* | 12/2010 | Bo | .................. | B65G 1/0414 |
| | | | | 180/41 |
| 2017/0121110 A1* | 5/2017 | Zombori | ........... | B65G 1/0492 |

\* cited by examiner

METHOD AND A DEVICE FOR MOVING OBJECTS ON SHELVES

TECHNICAL FIELD

This invention relates in general to an automated handling system and more particularly to a method and a device for moving objects on shelves in a storing system.

PRIOR ART

Material handling systems allow for various orders to be filled in warehouse environments. Depending on the warehouse and the type of goods being stored, material handling can be automated, semi-automated or manual. A carriage used in a warehouse, such as a three-dimensional warehouse, travels along a runway to deliver articles to article spaces, such as shelves, or the like, extending along the runway and to retrieve articles from the shelves. The carriage has an article-carrying area. Some carriages are capable of delivering and retrieving articles several articles deep on the article spaces. In some prior art arms extend outwardly from the carriage in a cantilevered fashion quite far into the shelf area thereby experiencing forces tending to cause the arms to sag.

W0201313252 relates to a conveyance vehicle, in particular a self-propelled shuttle for storing loaded goods in and removing them from a storage shelf in a shelf warehouse, said shuttle comprising a base frame made of a plurality of frame parts, a plurality of running wheels and a telescopic load-bearing device. The telescopic load-bearing device can be only limited extended from the shuttle.

US20070144991 discloses a load-bearing means for a transport system, in particular for a shelf-stacking device with a telescopic table and a method of operating it. A top table and an intermediate table can be displaced in linear guide systems relative to one another and relative to a bottom table provided with a drive system. A transmission system is provided as a means of displacing the top table depending on the relative movement between the bottom table and the intermediate table.

U.S. Pat. No. 6,042,321 issued on Mar. 28, 2000 to Label relates to an automated storage system for receiving, storing and returning dairy cases stored without pallets. Specifically, the automated storage system comprises an article transporter which includes a shuttle that deposits and retrieves dairy cases stored in storage lanes of a storage rack and a rail system for supporting the shuttle and dairy cases stored thereon. One or more shuttles may be used in the automated storage and retrieval system and are coupled via a shuttle bridge. The rail system includes two or more outer support rails and two or more inner support rails for supporting the shuttle and dairy cases.

In some prior art systems objects or boxes are supported on shelves also when moved by a telescopic load-bearing device of a carriage or a shuttle. As a result vibrations and movements are generated in the shelves and sometimes the complete storage system.

An object of the present invention is to provide a shelving system with an improved capability of displacing objects on shelves.

SUMMARY OF THE INVENTION

In accordance with one aspect of the invention a shuttle is operated between a plurality of ends of shelves supporting objects in a shelving system. A first strip and a second strip are connected to propelling means. Said first strip and said second strip are connected the shuttle, such as to opposing sides of a support head carried by said shuttle. By operating the propelling means the strips can be pushed and retracted, respectively, to displace said shuttle along shelves.

In various embodiments said strips are connected to said support head so as to raise a suspension head and any objects engaging said suspension head. The support head can comprise a rotatable rim to which one or both of said strips are connected. Pushing one strip further away than the other causes a rotating movement of said rotatable rim. The rotatable rim is, e.g., provided with wheels engaging a curved bottom surface of said suspension head. By raising the suspension head objects carried by the shuttle can be transported over the shelves without engaging the shelves during the transport. When the object is located at an intended new position the suspension head is lowered and the object will instead rest on the shelf. The shuttle then can be moved to a new position without interacting with the object.

In various embodiments guides are provided in said shelves to guide said first strip and said second strip when the strips are pushed and retracted, respectively. The guides can be formed as punched elements of the shelves. The present invention using strips that are pushed away and retracted, respectively, can operate on shelves of substantially greater length than prior art systems using telescopic arms or similar devices. In various embodiments of the present invention the shuttle can be operated along shelves and keeping objects in an uplifted position from the shelves during movement.

The shuttle can be moved supported by a carriage in a transporting path along ends of shelves. In various embodiments the carriage runs on rails or tracks extending perpendicularly to the shelves. The carriage can be provided with propelling means, e.g. including drive gears, that will push and retract the strips. Shuttles and carriages are controlled and monitored by a central unit. Each carriage can be provided with a control unit.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Smaller sized storing systems comprise a plurality of shelves extending in parallel from a transporting path. Objects are picked up by a carriage running along said transporting path and are normally delivered to another conveyor. From the conveyor the objects can be manually or automatically delivered from the storing system. Some systems of this type are referred to as miniload systems and are designed for smaller objects of lower weight, such as up to 50 kg.

Figure 1:
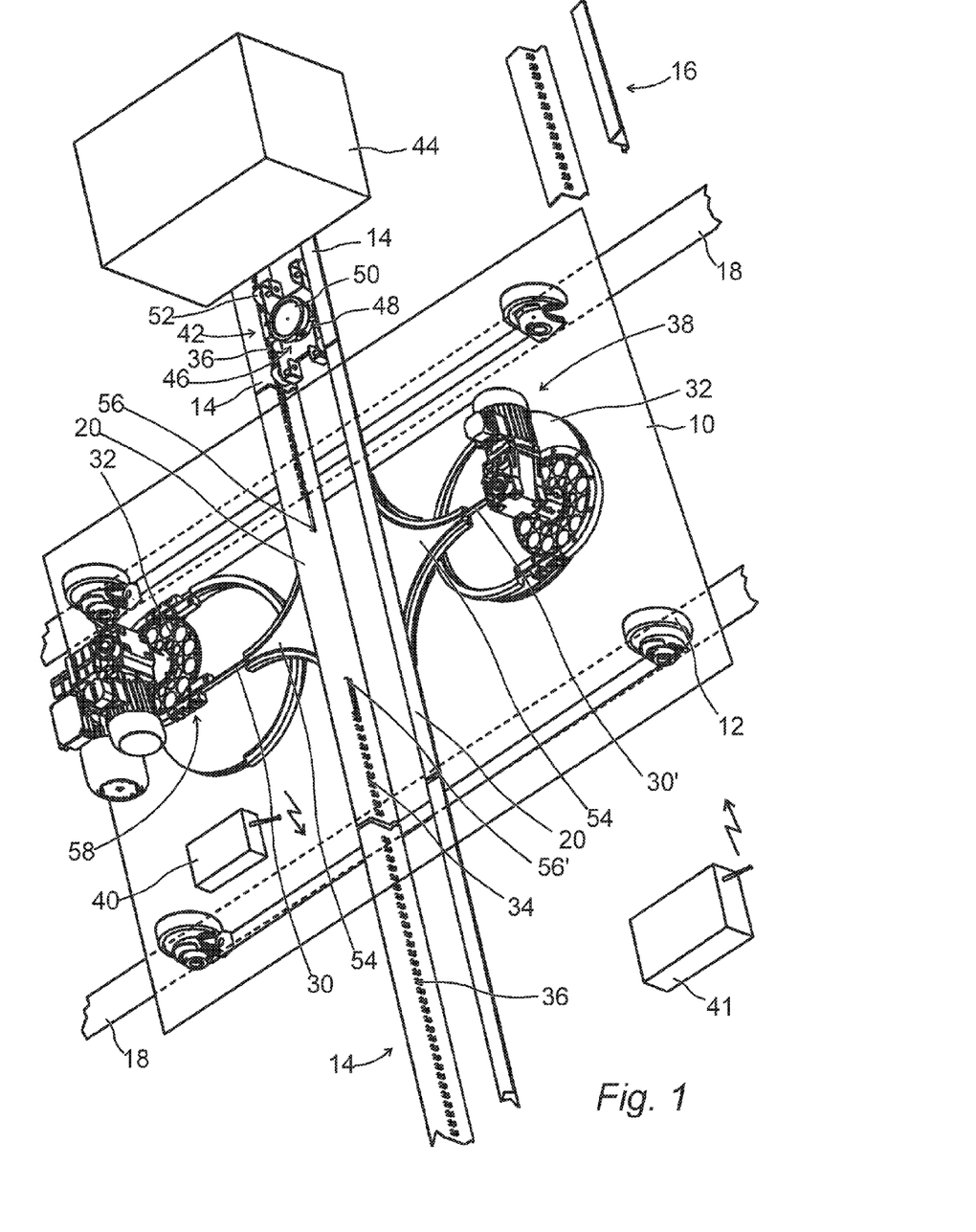
FIG. 1 is a schematic perspective view of one embodiment of an installation operating in accordance with the invention.

In the embodiment shown in FIG. 1 of a small section of a miniload system a carriage 10 having four wheels 12 is positioned in front of a specific shelf 14. The shelf extends on either or both sides of a transporting path in perpendicular directions from said transporting path. A further shelf 16 is schematically shown in FIG. 1. Each shelf 14 comprises two rails extending in parallel. Further details of the shelf 14 are described below with reference to FIG. 4. In the shown embodiment the transporting path comprises two longitudinally extending girders 18 supporting the wheels 12 of the carriage 10. The carriage 10 further comprises a section 20 of rails corresponding to the shelves 14 or the rails of the shelves 14. The section 20 of rails on the carriage 10 extends between two opposing ends of said shelves 14 when the carriage 10 is positioned correctly between the shelves 14. For example, the section 20 of rails on the carriage 10 extends between opposing ends of the rails of the shelves 14 when the section 20 of rails on the carriage 10 is aligned with the rails of the shelves 14.

In the illustrated embodiment a first strip 30 and a second strip 30' extends from rolls or reels 32 arranged on the carriage 10 into guide elements 34 extending along said section 20 of rails. The shelves 14, 16 are provided with corresponding guides 36 extending along said shelves. In the position of the carriage 10 as shown in FIG. 1 guides 36 form an extension of the guide elements 34 and the strips 30 can be pushed from the guide elements 34 of the carriage 10 into the guides 36 of the shelves 14. Said guide elements 34 of the carriage 10 and said guides 36 of the shelves 14 support and at least partly enclose the strips 30 when the strips are pushed out and retracted.

The carriage 10 also comprises propelling means 38 such as an electric motor that is operatively connected to said strips 30, 30', such as through the rolls or reels 32. The propelling means 38 is controlled by a control unit 40 and can be driven in two opposite directions, so as to be able to push and retract, respectively, said strips 30. Electric power to said propelling means 38 and said control unit 40 can be supplied by a trolley brush (not shown) on the carriage 10 or similar collector gear. For example, the first strip 30 is operated by a first propelling means 38 and the second strip 30' is operated by a second propelling means 38. For example, the first and second strips 30, 30' can be operated independently of each other. As shown in FIG. 1 there are provided two sets of rolls 32 and propelling means 38 each operating on a separate strip 30, 30'. The control unit 40 normally is connected to a central unit 41 supervising, monitoring and controlling all units of the shelving system. In various embodiments the control unit 40 and the central unit 41 are provided with communication means for wireless communication.

A shuttle 42 is provided an the carriage 10 when the carriage 10 is moved along the girders 18. In the position shown in FIG. 1 the shuttle 42 has been moved along the guide elements 34 and further away from the carriage 10 on the guides 36 of the shelves 14. The shuttle 42 is moved to collect an object 44 supported on the shelf 14. The shuttle 42 comprises a support head 46, a rotatable rim 48 and a suspension head 50.

Figure 2:
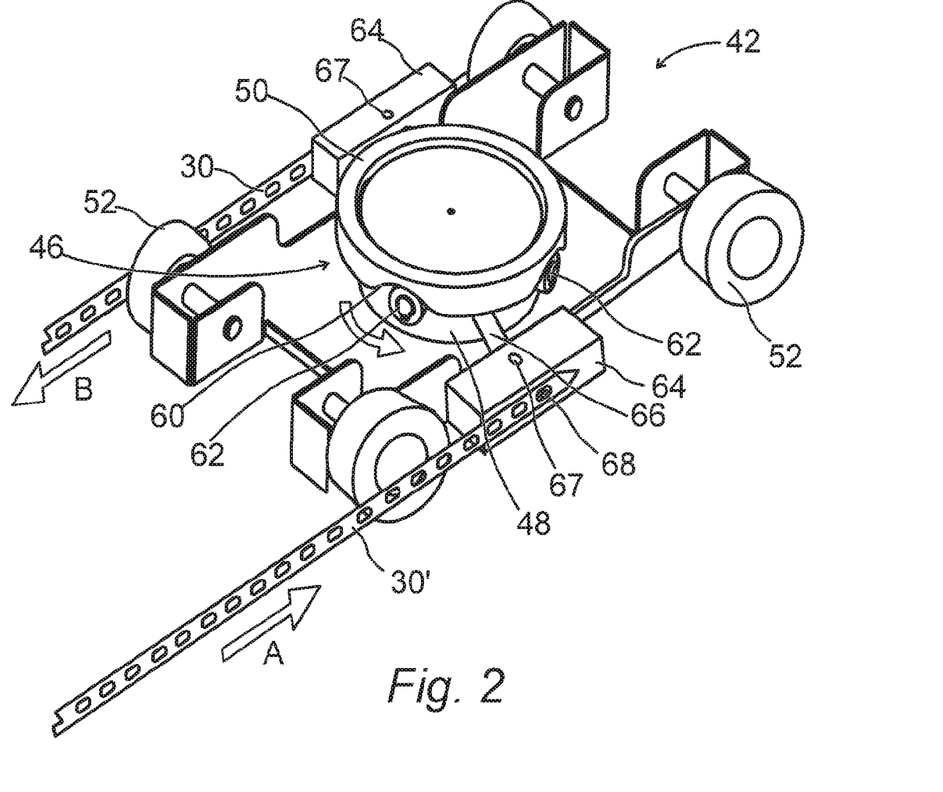
FIG. 2 is a schematic perspective view of one embodiment of a shuttle in accordance with the invention.

In various embodiments, such as the one shown in FIG. 1, the shuttle 42 is supported by four shuttle wheels 52 arranged and dimensioned to run an the shelves 14 or the rails of the shelves 14. The first strip 30 engages a first side of said support head 46 and the second strip 30' engages a second side of said support head 46 opposite to the first side. Hence, at least one of the strips 30, 30' engages the support head 46. In the illustrated embodiment, the strips 30 30' are connected to opposite sides of the rotatable rim 48, wherein the rotatable rim 48 is rotated by pushing one strip 30 and retracting the other. Alternatively, only one of the strips 30, 30' is pushed. Alternatively, only one of the strips 30, 30' is connected to the rotatable rim 48 for rotation thereof, wherein the rotatable rim 48 is rotated by pushing or retracting said strip 30 in relation to the other strip 30'. Then the other strip 30' can be connected substantially anywhere an the shuttle 42 except an the rotatable rim 48. For example, by pushing one strip further away or a longer distance than the other the rotatable rim 48 will be rotated. The rotating movement of the rotatable rim 48 is transformed into a raising movement of the suspension head 50, c.f. FIG. 2.

Figure 6:
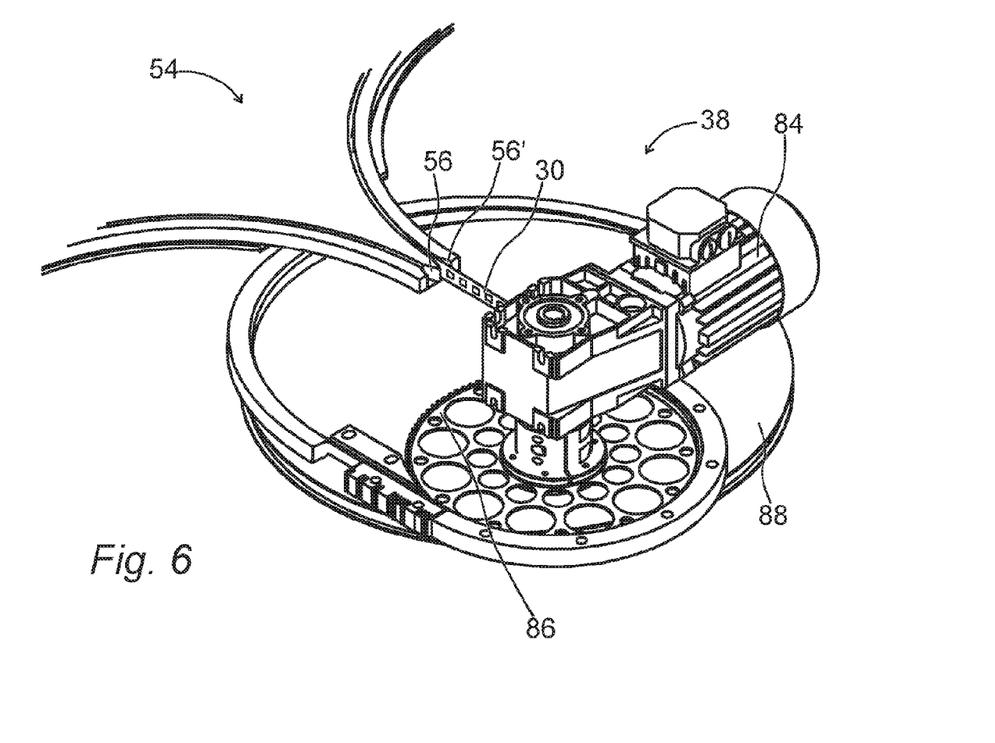
FIG. 6 is a schematic perspective view of one embodiment of a propelling means utilized in an installation operating in accordance with the invention.

In the embodiment shown in FIG. 1 a deflection arrangement 54 is provided for each strip 30, 30' to direct the strip 30, 30' through openings 56 formed in the sections 20 of rails and into the guide elements 34. Two different orifices, c.f. FIG. 6, in the deflection arrangement 54 lead through curved sections to two different openings 56, 56 in the sections 20 of rails, each opening corresponding to an intended direction of the strip 30, 30'. A switch 58 arranged between the rolls 32 and the deflection arrangement 54 is controlled by the control unit 40 to direct the strip 30, 30' into one of the two orifices depending on which direction the strip and shuttle will be moved in. The switch can comprise a linear actuator, such as an electromagnet.

FIG. 2 shows one embodiment of the shuttle 42. This embodiment comprises four shuttle wheels 52 designed to engage and roll on the shelves 14, 16 in a direction parallel to the shelves. The shuttle 42 supports the support head 46 comprising the rotating rim 48 and the suspension head 50. In various embodiments the suspension head 50 is formed as a cylinder having a curved lower side including a plurality of cam indentations 60 formed in a bottom edge. The rim 48 also is formed as cylinder and is provided with rollers or wheels 62 distributed evenly around an outer cylinder wall. The rollers or wheels 62 are arranged to rotate in a plane tangential to said rim 48. The bottom edge of said suspension head 50 rests on said rollers or wheels 62. Hence, the support head 46 is arranged for lifting and lowering at least the suspension head 50, such as by means of at least one cam of the rim 48 interacting with a lower portion of the suspension head 50, or at least one wheel 62 or stud interacting with a cam indentation 60. Alternatively, the support head 46 is arranged with a thread interacting with a corresponding thread in a base of the shuttle 42, wherein the support head 46 can be raised and lowered by rotation.

On two opposite sides of said shuttle 42 there is, according to the illustrated embodiment example, provided a sliding connector 64, 64'. Each connector 64, 64' is displaceable in the same direction as the shuttle will move an the shelves 14. A bar 66 is pivotably connected to each one of said connectors 64, 64' and to said rotatable rim 48 in a fixed position. The bar 66 is pivoted around a shaft 67 as indicated in FIG. 2. Moving one of said connectors 64, 64' further away than the other will result in a rotating movement of said rotatable rim 48 as a result of a displacement of the bars 66. In the position shown in FIG. 2 the Bars 66 have been displaced different distances from a central base position on the shuttle 42. In the illustrated embodiment, the first strip 30 is connected to the sliding connector 64, wherein the second strip 30' is connected to the other sliding connector 64'.

In various embodiments the position shown in FIG. 2 is a lower position in which the rollers or wheels 62 are located in the cam indentations 60 of the suspension head 50. In the lower position the shuttle 42 can be moved along the shelves 14 below objects disposed on the shelves.

Figure 3:
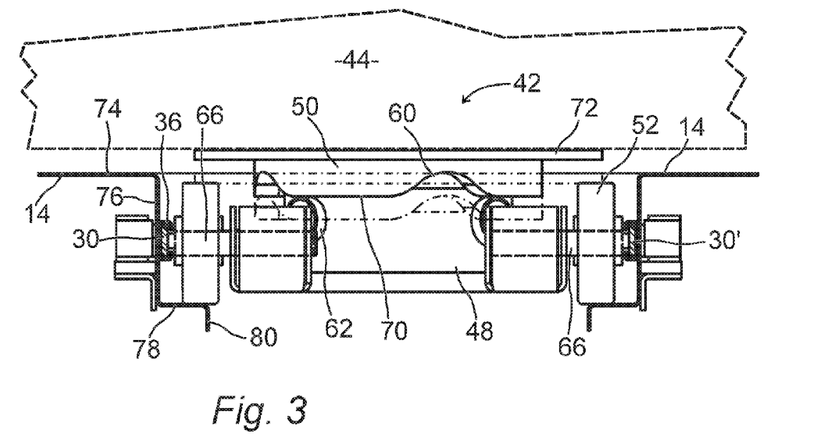
FIG. 3 is a front view of the device shown in FIG. 2.

One strip 30, 30' extends on either side of the shuttle 42. In the embodiment shown in FIG. 2 each strip 30, 30' is releasably connected to one connector 64, for instance by means of one or a plurality of biased locking balls 68 or other similar protruding elements. In various embodiments the connectors 64 are provided with other fastening means such as clamps in which the strips 30, 30' are releasably fixed. The strips 30, 30' are guided in guide elements and guides, c.f. FIG. 1 and FIG. 3. When the strips 30, 30' are moved in the same direction and at the same speed they will both contribute to a movement of the shuttle 42, also in the same direction. By moving the strips 30, 30' in different directions a rotating movement of the rotatable rim 48 will be induced. By rotating the rotatable rim 48 counter clockwise from the position shown in FIG. 2, as a result of pushing one strip in the direction of arrow A and retracting one strip in the direction of arrow B, the rollers or wheels 62 will raise the suspension head 50 because as they leave the cam indentations 60 and instead roll on to a flat bottom edge of the suspension head 50, c.f. FIG. 3.

In FIG. 3 a shuttle 42 is supporting and moving an object 44. As shown in FIG. 3 the rotatable rim 48 has been rotated to a position where the rollers or wheels 62 engage a flat bottom edge 70 of the Suspension head 50 and the suspension head 50 has been raised to a position above the shelves 14. The rollers or wheels 62 are not positioned in the cam indentations 60. As shown in FIG. 3 a flat lifting plate 72 is arranged on top of the suspension head 50. The lifting plate 72 is rectangular and is dimensioned in view of the size of the objects 44.

Figure 4:
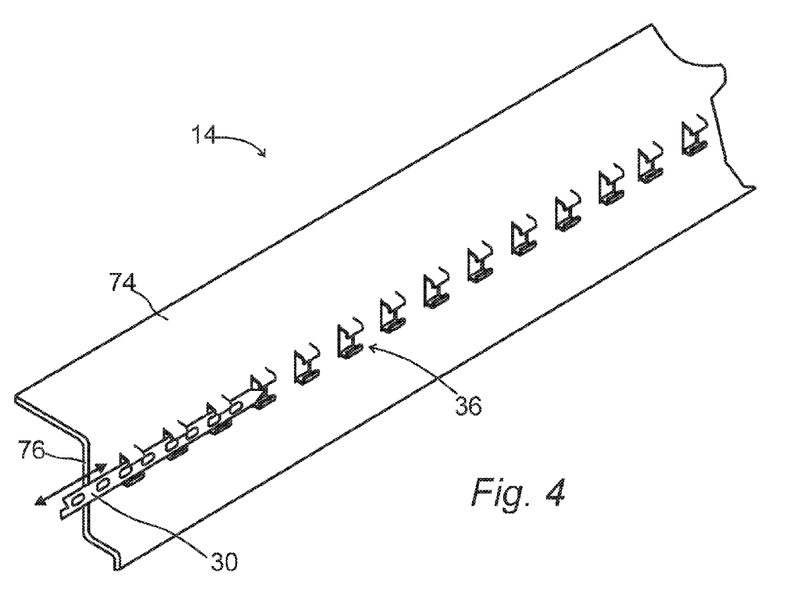
FIG. 4 is a schematic perspective view of one embodiment of a section of a shelf suitable to be utilized with a device in accordance with the invention.

As indicated in FIG. 4 each shelf 14, 16 can be formed by elongated Z shaped sections having one upper horizontal side 74 where objects 44 can be disposed, one vertical side 76 in which the guides 36 are arranged, and one lower horizontal side 78 on which the shuttle wheels 52 run. For example, the shelf 14 is formed by a metal profile. The sections 20 of the rails on the carriage are formed with corresponding upper horizontal side 74, one vertical side 76 and one lower horizontal side 78, so as to allow the shuttle 42 to move between the carriage and the shelves 14. As shown in FIG. 3 the lower horizontal side 78 can have an extension 80 directed downwardly. The strips 30 extend in the guides 36 of the shelves and are releasably connected to the bar 66. The dash and dot line in FIG. 3 indicates a lower position of the suspension head 50 and the lifting plate 72. In said lower position an upper side edge of the lifting plate 72 is below or just in line with the upper horizontal side 74 of the shelves 14.

As shown in FIG. 4 each of the shelves 14, 16 is provided with guides 36. In various embodiments the guides 36 are formed as punched elements of the shelves 14, 16. In other embodiments the guides 36 are provided as separate elements attached to the shelves. The guides 36 are designed to enclose the strip 30 sufficiently close to keep the strip within the guides 36 still allowing the strip 30 to be pushed and retracted smoothly therein. The position of the strip 30 is shown in FIG. 4 without the shuttle 42. The guides 36 of the shelves shown in FIG. 4 can be similar to the guide elements 34 provided in the sections 20 of rails arranged on the carriage.

The upper horizontal sides 74 of the shelves 14 have an extension and size sufficient to support objects 44. The vertical side 76 has a height extending the diameter of the shuttle wheels 52, c.f. FIG. 3.

Figure 5:
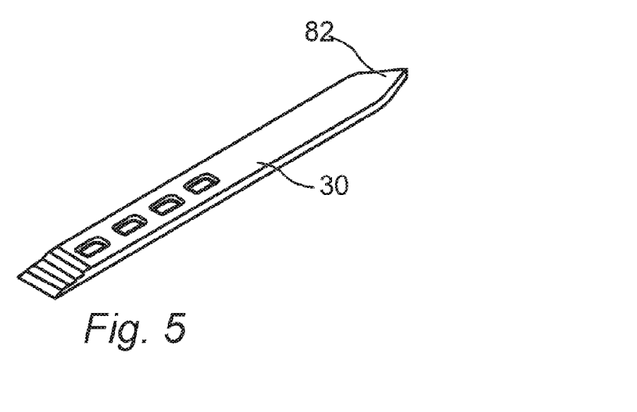
FIG. 5 is a schematic perspective view of one embodiment of a section of a strip suitable to be utilized with a device in accordance with the invention.

The embodiment of a strip 30 shown in FIG. 5 comprises a plurality of different layers made of fibreglass, carbon, KEVLAR, polyester and TEFLON. The strip 30 is perforated with rectangular apertures over a substantial length. As shown in FIG. 5 a pointed top end 82 can be formed without apertures. The pointed top end 82 will facilitate the entry into the guides 36 and guide elements 34 and will keep the strip within the guides 36 and guide elements 34, particularly when the strip pushed forward. The strip 30 is sufficiently rigid, so as not to crease or fold but still being able to be somewhat bent or deflected. The rigidity of the strip 30 is sufficient for it not to drop out of the guide elements and guides. The strip 30 has a thickness corresponding to the opening of the guide elements 34 and the guides 36, so as to allow the strip to move without hindrance along the rails and shelves. In various embodiments the strip 30 is designed without apertures.

The embodiment of a propelling means 38 shown in FIG. 6 comprises an electric motor 84 and a tooth wheel 86 suitable in embodiments where a perforated strip 30 is used. The size of the teeth corresponds to the size of the apertures in the strip. The electric motor 84 is precisely controlled by the control unit 40, so as to keep track of the present position and extension of the strip 30. The openings 56 and 56 are formed in the deflection arrangement 54 to receive the strip 30 when it is pushed out by the tooth wheel 86. A switch 58, c.f. FIG. 1, will direct the pointed top end of the strip 30 into either one of the openings 56 and 56' depending on the direction intended for the shuttle. When the strip is retracted, for instance when the carriage is moving, it is winded up on a reel 88. In embodiments using a non-perforated strip 30 the reel 88 or a specifically arranged drive gear (not shown) without teeth is used for moving the strip along the shelves 14. The total length of a strip 30 corresponds to the length of the shelves 14, 16.

Figure 7:
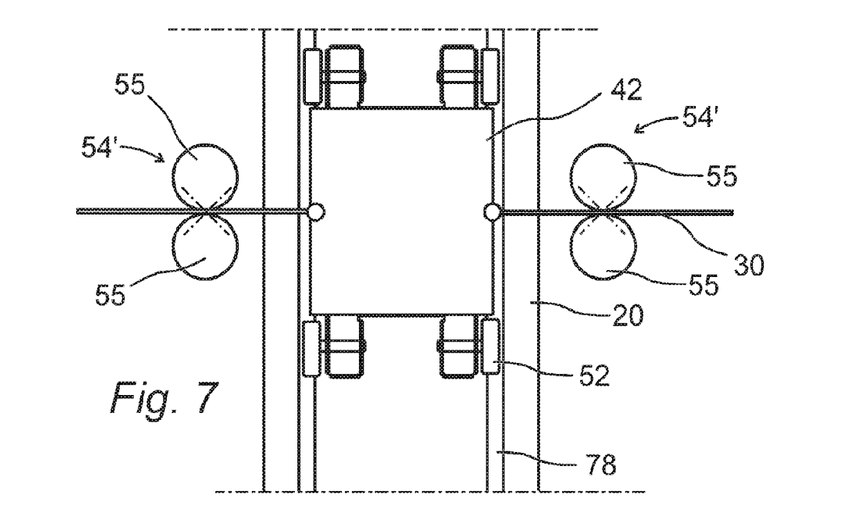
FIG. 7 is a schematic top view of an alternative embodiment of a deflection arrangement in a neutral position for directing a shuttle in a selected direction.
Figure 8:
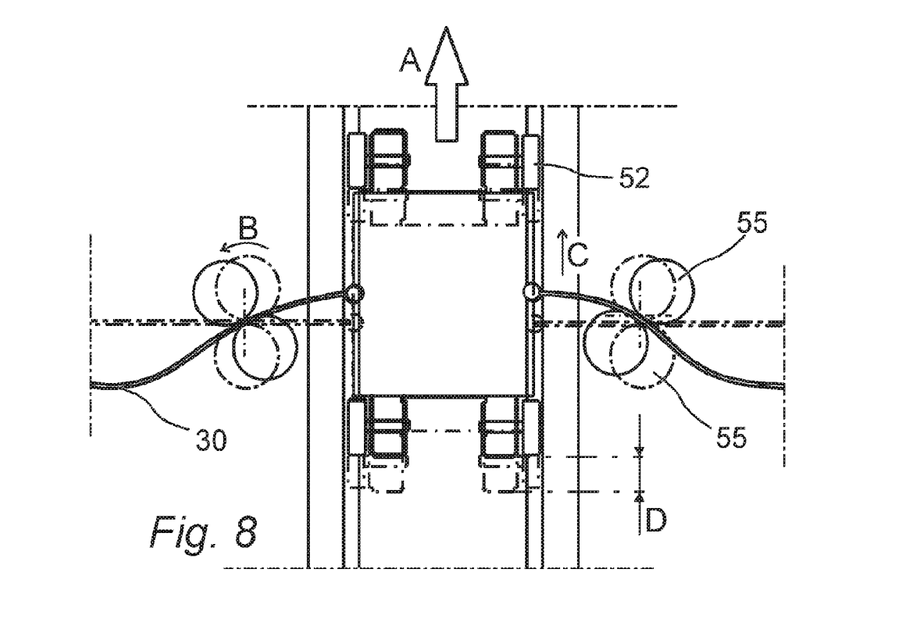
FIG. 8 is a schematic top view of the embodiment of a deflection arrangement shown in FIG. 7 in a position where the shuttle is directed to move in a first direction.
Figure 9:
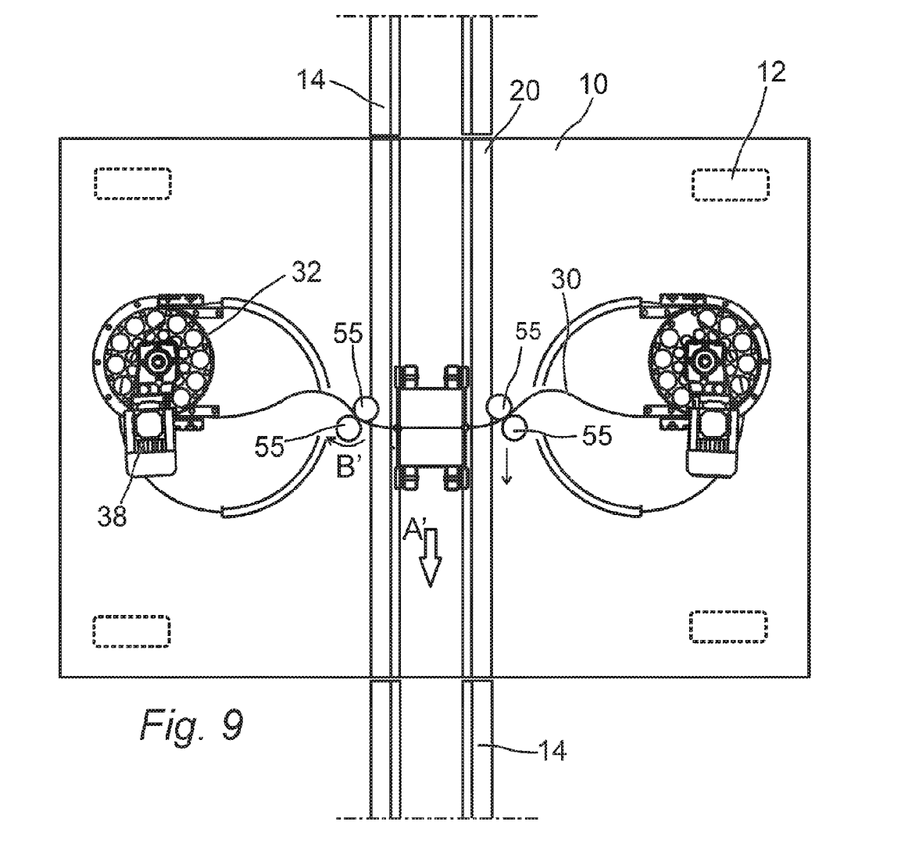
FIG. 9 is a schematic top view of the embodiment of a deflection arrangement shown in FIG. 7 in a position where the shuttle is directed to move in a second direction opposite to said first direction.

In the embodiment shown in FIG. 7 to FIG. 9 the strip 30 is attached to the sliding connectors 64 of the shuttle 42 preferably at a central position. The shuttle wheels 52 run on the lower horizontal side 78 of the sections 20 of the rails on the carriage corresponding to the embodiments described above. A first alternative deflection arrangement 54' is provided on the carriage to initially direct the shuttle 42 in either direction. In FIG. 7 the shuttle 42 is in a starting or neutral position on the carriage and the first alternative deflection arrangement 54' is in a neutral position.

The first alternative deflection arrangement 54' comprises two pairs of guide wheels 55 arranged at a distance from each other, one pair on either side of the rails 20. The strip 30 runs between the guide wheels 55. For example, the distance between the guide wheels 55 corresponds to the thickness of the strip 30 and the strip 30 runs between the guide wheels 55. Each pair of guide wheels 55 is arranged rotatable around a common axis depicted by the intersection of dash and dot lines in FIG. 7 and extending perpendicular to the horizontal sides 78.

In FIG. 8 the shuttle 42 is set to be moved in the direction of arrow A. This setting is accomplished by rotating one pair of guide wheels 55 around its common axis of rotation in the direction of arrow B and by rotating the other pair of guide wheels 55 around its common axis of rotation in the opposite direction on the opposing side of the shuttle. The rotating of the pair of guide wheels deflects the strip 30 and forces the shuttle to move a distance D in the direction of arrow C. The strip 30 extends through openings 56 in the rail sections 20, c.f. FIG. 1.

FIG. 9 shows the carriage 10 with four wheels 12 and the rail sections 20. The carriage 10 supports the shuttle 42 in a position where the shuttle 42 is set to be moved in the direction of arrow A'. This setting is the result of rotating the pair of guide wheels 55 in the direction of arrow B and in the opposite direction on the opposing side of the shuttle. Further movement of the strip 30 out of rolls 32 driven by propelling means 38 will push the shuttle 42 further away in the direction of arrow A' out of the carriage 10 and into the shelves 14 in accordance with the general description above.

The carriage 10 is operatively connected to the central unit 41 (not shown) to be directed to a specific shelf 14 for delivering or collecting an object. The central unit 41 keeps track of each object and the content thereof stored in the shelving system. Information about the length of the shelves and the size of each object stored thereon is stored in the control unit 40 or provided by the central unit 41.

While certain illustrative embodiments of the invention have been described in particularity, it will be understood that various other modifications will be readily apparent to those skilled in the art without departing from the inventive concept. Different embodiments readily can be combined by a skilled person where appropriate. Accordingly, the claims be construed as encompassing all equivalents of the present invention which are apparent to those skilled in the art to which the invention pertains.

The invention claimed is:

1. A method for moving objects on shelves of a storing system by operating a shuttle between a plurality of ends of said shelves, comprising the steps of:
   engaging a first strip at one side of a support head of said shuttle,
   engaging a second strip at said shuttle,
   by means of propelling means displacing said shuttle along said shelves by pushing and retracting said strips,
   raising or lowering at least a suspension head of said support head by pushing either one of said first strip and said second strip further away than the other strip
   supporting said shuttle on a carriage,
   retracting said strips onto rolls provided on said carriage, and
   directing said strips in guides of said shelves.

2. A method of moving objects as claimed in claim 1, further comprising:
   engaging the first strip at a first side of the support head of said shuttle,
   engaging the second strip at a second side of said support head of said shuttle opposing said first side,
   connecting said first strip and said second strip to a rotatable rim having a plurality of rollers supporting a curved lower side of said suspension head, and
   rotating said rim by pushing either one of said first strip and said second strip further away than the other strip.

3. A method of moving objects as claimed in claim 1, further comprising deflecting said strips into guode elements From said rolls.

4. A device for moving objects on shelves of a storage system, comprising:
   a shuttle travelling along a path extending over a plurality of ends of said shelves, comprising:
   a first strip engaging one side of a support head of said shuttle,
   a second strip engaging said shuttle, propelling means operable to displace said shuttle along said shelves by pushing and retracting said strips, wherein said support head comprises a suspension head,
   a rotatable rim supporting said suspension head, wherein at least one of said first strip and said second strip is operatively connected to the rotatable rim,
   said shelves comprise guides supporting said first strip and said second strip, and
   a carriage supporting said shuttle during travelling along a path extending over a plurality of ends of said shelves.

5. A device as claimed in claim 4, wherein the first strip engages a first side of the support head of said shuttle,
   the second snip engages a second side of said support head of said shuttle opposing said first side, and
   said shuttle comprises two sliding connectors, each connected to said rotatable rim, wherein each sliding connector is connected to one of said first strip and said second strip.

6. A device as claimed in claim 5, wherein each sliding connector comprises a protruding connecting element releasably connecting said sliding connector to one of said first strip and said second strip.

7. A device as claimed in claim 4, wherein a deflection arrangement is provided to direct said first strip and said second strip to run in either of two opposite directions along said shelves.

8. A device as claimed in claim 7, wherein
   said deflection arrangement comprises a pair of guide wheels arranged at a distance from each other for receiving said strip between them, and
   said pair of guide wheels being rotatable around a common axis so as to deflect the strip during rotation.

9. A device as claimed in claim 7, wherein
   said deflection arrangement comprises two different openings,
   each opening corresponding to the intended direction of the strip and a directing element directing said strip into either one of said two different openings.

10. A device as claimed in claim 4, wherein the carriage comprising guides elements supporting said first strip and said second strip, and propelling means pushing and retracting said strips, so as to move said shuttle in different directions.

11. A device as claimed in claim 10, wherein
   said shelves are formed as Z sections having one upper horizontal side, one vertical side in which the guides are arranged, and one lower horizontal side an which the shuttle wheels run.

* * * * *